Figure 4:
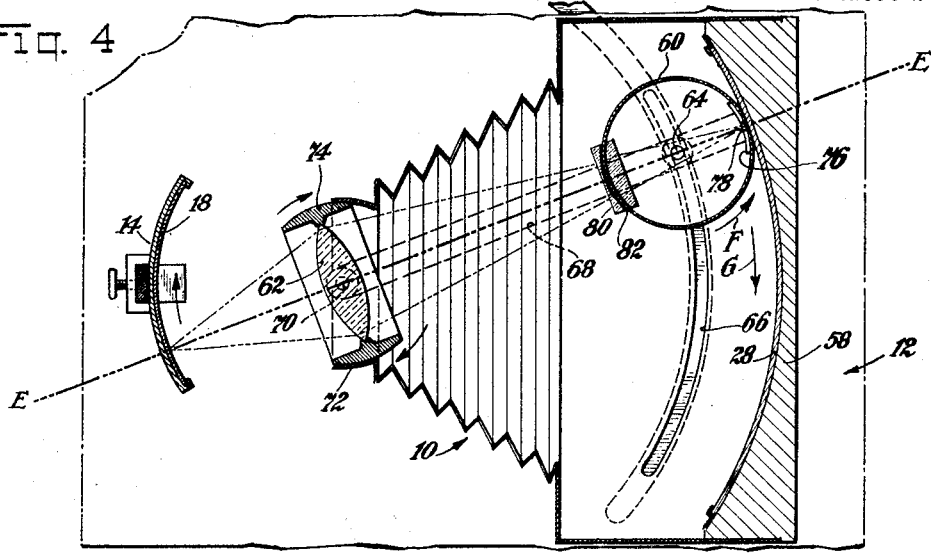

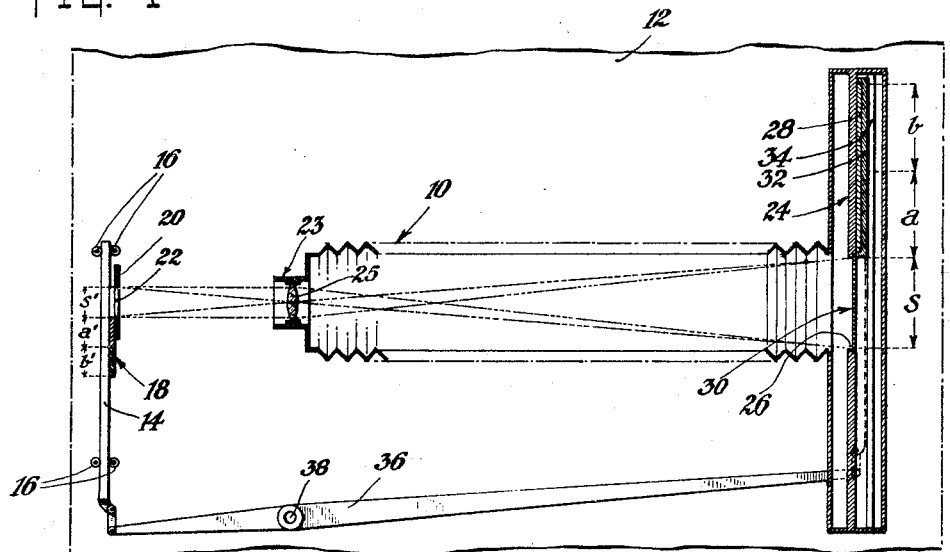
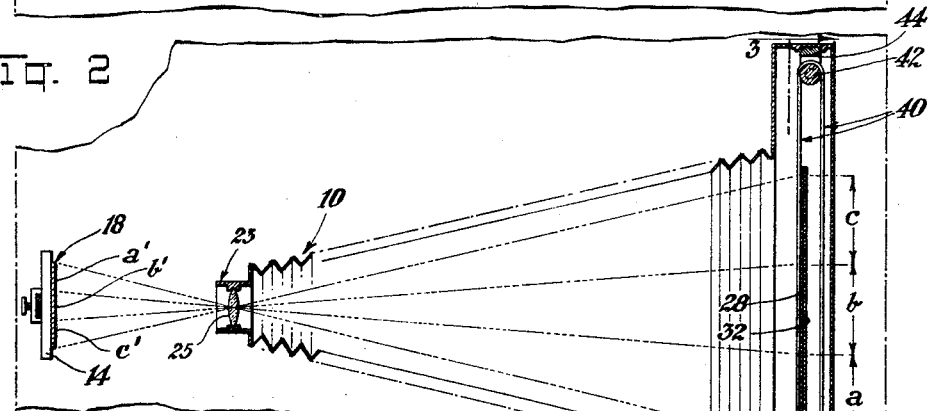
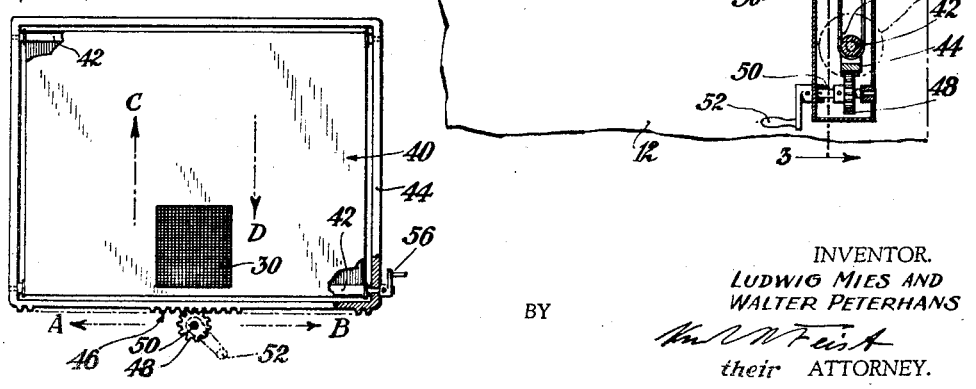

INVENTOR.
LUDWIG MIES AND
WALTER PETERHANS
their ATTORNEY.

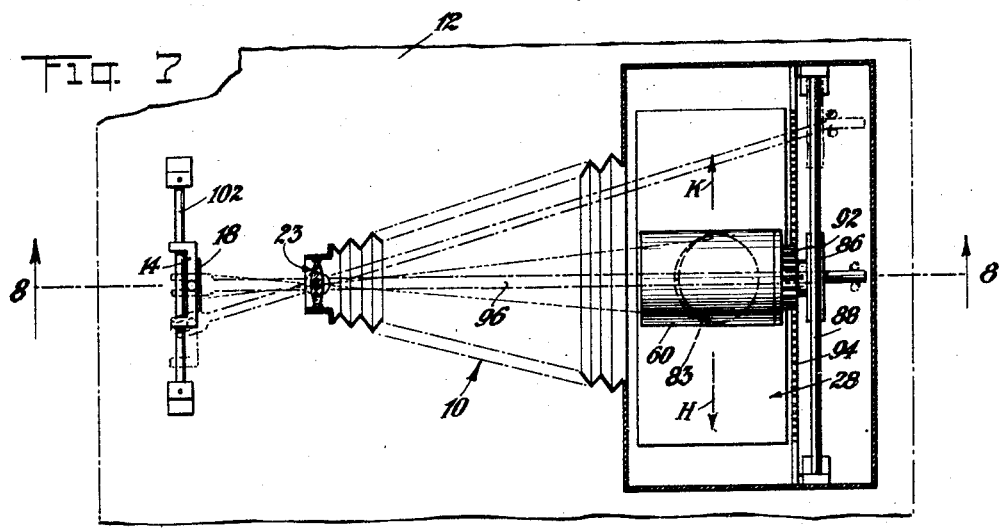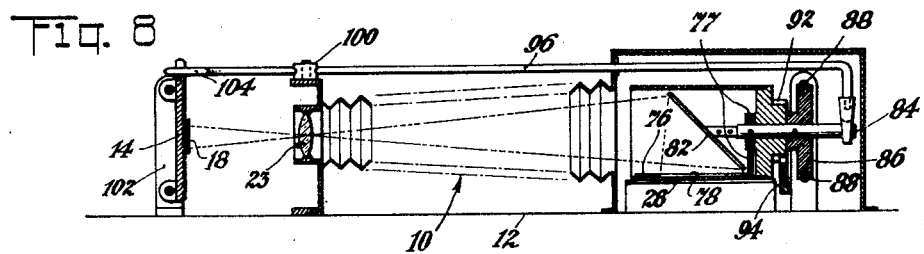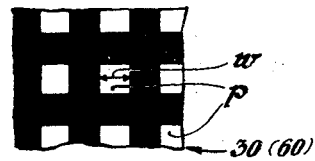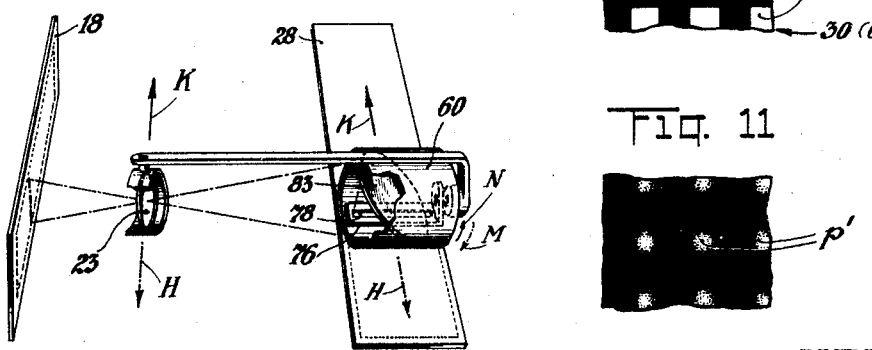

Patented May 12, 1942

2,282,337

UNITED STATES PATENT OFFICE 2,282,337

APPARATUS FOR THE PRODUCTION OF DOT-COMPOSED OR SCREENED NEGATIVES

Ludwig Mies and Walter Peterhans, Chicago, Ill.

Application January 24, 1939, Serial No. 252,654
In Germany January 25, 1938

5 Claims. (Cl. 88—24)

Our invention relates to photography, and more particularly to a method and an apparatus for the production of dot-composed or screened negatives.

Half-tone screens are comparatively expensive, and, if a half-tone screen exceeds a certain size, the costs of manufacture of such large half-tone screens become so high, that they are burdensome for the trade. Hitherto, placards or other large sheets bearing reproductions of images have been usually manufactured in such a manner, that a plurality of small dot-composed negatives are produced by the use of small half-tone screens and an equal number of electrotypes are prepared from said negatives. Each of said electrotypes is used for the reproduction of images forming a portion of the entire image on small sheets, and several individual small sheets are then pasted on a board to form in combination a placard showing the entire image.

One object of our invention is to produce dot-composed or screened negatives which are of larger size than the size of the half-tone screen used for the reproduction, so that it becomes possible to obtain a large reproduction on a large sheet, for example on a wall-paper or on a placard, by means of the use of a small half-tone screen which may be smaller than the half-tone screen hitherto used for the reproductions on the small sheets in the above described method.

Another object of our invention is to produce large half-tone screens by means of a small master half-tone screen.

A further object of our invention is to provide a method, which permits the production of high grade dot-composed negatives by means of the use of a normal half-tone screen. Hitherto, such high grade negatives could be obtained only by the use of special half-tone screens having varying intensities in each of their transparent portions.

Still another object of our invention is to provide a method for the production of half-tone screens having varying intensities in their transparent portions.

A further object of our invention is to provide an apparatus for the production of dot-composed negatives according to our invention.

In order to carry out our invention into practice, we reproduce an original through a half-tone screen on a negative of larger size than the size of said half-tone screen, and move said half-tone screen and said negative relative to each other. The negative and the screen may be moved continuously or step by step relative to each other. Our apparatus comprises a camera, in which either the negative or the half-tone screen is movably arranged. We use either a straight half-tone screen or a cylindrical half-tone screen in the camera.

Figure 5:
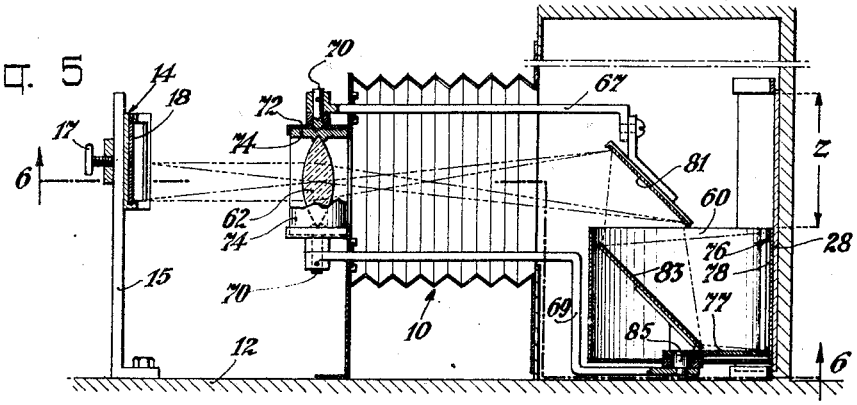
Figure 6:
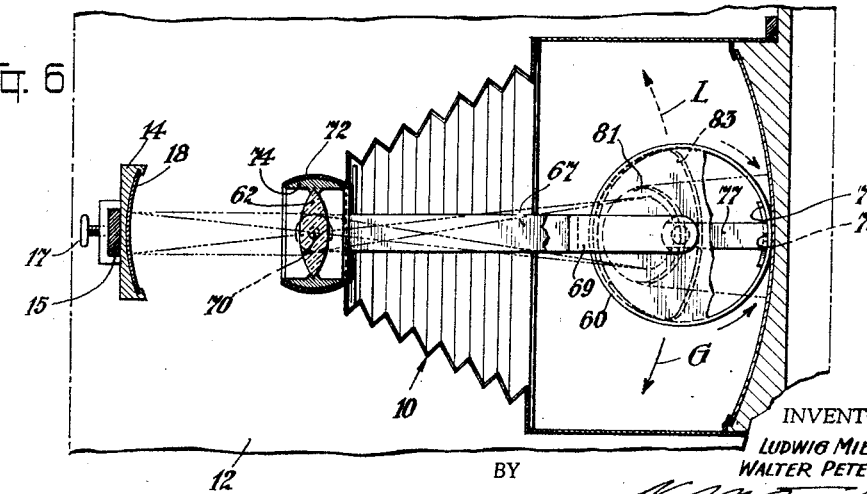

The above mentioned objects and advantages as well as other objects and advantages will be more fully disclosed in the following specification reference being had to the accompanying drawings forming part of this specification, in which:

Fig. 1 is a diagrammatic top plan view, partly in section, of an apparatus, in which a straight half-tone screen is held stationary in the camera, Fig. 2 is a diagrammatic top plan view, partly in section, of a different apparatus, in which a straight half-tone screen is movably arranged in the camera, Fig. 3 is a cross-sectional view taken on line 3—3 of Fig. 2, Fig. 4 is a diagrammatic top plan view, partly in section, of a further embodiment of our apparatus, in which a cylindrical half-tone screen is movably arranged in the camera, Fig. 5 is a diagrammatic front elevational view, partly in section, of an apparatus, in which a cylindrical half-tone screen is used in combination with two mirrors, Fig. 6 is a sectional view of the apparatus shown in Fig. 5, taken on line 6—6 of Fig. 5, Fig. 7 is a diagrammatic top plan view, partly in section, of still another embodiment of our apparatus, in which only one mirror is used in combination with a cylindrical half-tone screen, Fig. 8 is a cross-sectional view taken on line 8—8 of Fig. 7, Fig. 9 is a diagrammatic perspective view of the main parts of an apparatus similar to that shown in Figs. 7 and 8, in which, however, the original is held stationary, Fig. 10 is a fragmentary top plan view of a normal half-tone screen in enlarged scale, and Fig. 11 is a fragmentary top plan view of a half-tone screen having varying intensities in each of its transparent portions, in enlarged scale.

Referring now to Fig. 1, 10 generally indicates a camera, which is mounted on a base 12 in any suitable manner. In front of the camera 10, a mounting 14 is slidably arranged between rollers 16 mounted on the base 12. An original 18 may be attached to the mounting 14 in any suitable mannner. A shield or mask 20 having an aperture 22 opposite to the objective 23 of the camera is arranged a certain distance from the mounting slide 14, so that the original 18 may be moved behind said shield 20. A stationary shield or mask 24 having an opening 26 is arranged inside the camera in front of the negative or light sensitive element 28 and is secured to the wall of the camera. A straight half-tone screen 30 is mounted in said opening 26 of the stationary shield 24. The negative 28 which may be a film or a plate is arranged in a holder 32 slidably arranged in a guide 34 mounted in the camera 10. The negative 28 has a larger size than the half-tone screen 30. A shifting lever 36 is pivotally mounted on the base 12 at 38. The pivot 38 is in alignment with the axis of the lens 25 of the objective. One end of the lever 36 is pivotally connected to the mounting slide 14, the other end of the lever 36 is pivotally connected to the holder 32, so that a movement of the negative holder 32 in one direction causes a proportional movement of the mounting 14 for the original 18 in opposite direction.

The operation of the apparatus shown in Fig. 1 in which the half-tone screen 30 is held stationary and the negative 28 is moved, is as follows:

According to one embodiment of our invention, the negative 28 and the original 18 connected therewith are moved step by step. Fig. 1 illustrates the position of the parts prior to the start of an operation. The negative 28 is covered by the shield 24, and the first portion of the original 18 is covered by the shield 20. The shutter of the camera (not shown) is closed. Now, the lever 36 is rotated and the negative 28 is moved to such an extent relative to the half-tone screen 30 that its portion $a$ is positioned behind the half-tone screen 30 in the space $s$. At the same time the original 18 is moved to such an extent, that its portion $a'$ is behind the opening 22 in the space $s'$. Then, as soon as the parts 28 and 14, 18 are at a standstill, the negative is exposed, so that the portion $a'$ of the original 18 is reproduced on the portion $a$ of the negative 28 through the half-tone screen 30. After the shutter of the camera has been closed, the negative 28 and the original 18 are further moved, so that the portions $a$ and $a'$ respectively are positioned behind the shields 24 and 20 respectively and the portions $b$ and $b'$ respectively are brought into the spaces $s$ and $s'$ respectively. As soon as the parts 28 and 18 are at a standstill, the negative is again exposed, so that the portion $b$ of the original is reproduced on the portion $b'$ of the negative. Then, the dot-composed negative thus obtained may be removed from the camera and may be used for the production of an electrotype according to any conventional process. Fig. 1 illustrates only two steps $a$ and $b$, but obviously, if the negative is of larger size, the method could be carried out in more than two steps. Furthermore, it will be apparent, that our method permits the production of large dot-composed negatives 28 by means of a small half-tone screen 30, and that the negatives may have such a size that an electrotype may be produced by means of which an entire image may be reproduced on a single sheet of paper for the manufacture of a placard. While we described only a relative movement between the negative and the screen in the direction of the length of the negative, means could be provided for a similar relative movement in the direction of the width of the negative, so that the negative may have a greater length and a greater width than the screen.

According to another embodiment of our invention, the negative 28 and the original 18 connected therewith are moved continuously, while the negative is exposed periodically. For this purpose, we couple the mechanism moving the negative with the mechanism actuating the shutter, so that the negative is exposed every time when a fresh line of transparent portions $p$ (see Fig. 10) of the plurality of lines of transparent portions of the screen 30 appears in front of the negative 28 during the movement of the negative. The time of each exposure is a fraction, i. e. about $\frac{1}{10}$–$\frac{1}{20}$, of the time required for the relative movement between the negative 28 and the screen 30 for a distance equal to the width $w$ (see Fig. 10) of a transparent portion.

Each of the above described methods produce dot-composed negatives as they are obtained by the normal use of normal half-tone screens illustrated in Fig. 10. Fig. 11 illustrates a special half-tone screen with varying intensities in each of its transparent portions $p'$. This type of half-tone screens produces high-grade dot-composed negatives of finer qualities, but hitherto no method could be developed which permits the manufacture of these special half-tone screens at a large scale in practice. Our method, however, permits the production of dot-composed negatives of the same fine qualities, although we do not use the special screen shown in Fig. 11 and use only the normal screen shown in Fig. 10. For this purpose we modify the above described two methods in the following manner:

If we move the negative step by step, we move same for short distances and expose the negative during a portion of each individual relative movement between the negative and the half-tone screen.

If we move continuously the negative, we expose periodically the negative as described above, but the time of each exposure, while being a fraction of the time required for the relative movement between the negative and the half-tone screen for a distance equal to the width of a transparent portion, is more than $\frac{1}{10}$ of said required time.

Figs. 2 and 3 illustrate another embodiment of our apparatus, in which the negative is held stationary and the screen is moved. The camera 10 is mounted on the base 12 in any suitable manner. The mounting 14 is stationary and is secured to the base 12 by suitable means. The original 18 may be attached to the mounting 14. The holder 32 carrying the negative 28 is held stationary inside the camera. An opaque endless belt or mask 40 surrounds the negative 28 and is guided by rollers 42 rotatably mounted in a frame 44. One side of said frame 44 is provided with a rack 46 being in engagement with a pinion 48 keyed to a shaft 50 journalled in the casing of the camera. The frame is slidably arranged in the camera, and the shaft 50 is provided with a handle 52, so that the frame may be shifted in either one of the directions A or B, when the shaft 50 is rotated. The belt or mask 40 has an opening 54. A straight half-tone screen 30 is inserted in said opening. One of said rollers 42 is provided with a handle 56, so that the belt and the screen may be moved in either one of the directions C or D by a rotation of the handle 56. Preferably, we move the belt and the screen into the position shown in Fig. 2, before we carry out an operation. In this position, the opaque belt acts as a shield covering the negative 28.

The methods of operation of the apparatus shown in Figs. 2 and 3 are the same as the above described methods of operation of the apparatus shown in Fig. 1 with the only difference that the screen is moved and the negative is held stationary. If the screen 30 is moved step by step and the negative is exposed only, when the screen is at a standstill, the screen first is moved to such an extent, that it is positioned in front of the portion a of the negative 28, so that the portion a' of the original 18 is reproduced on the negative. Then, the screen is moved until it is in front of the portion b of the negative, so that the portion b' of the original may be reproduced, and finally the screen is brought into a position in front of the portion c of the negative for the reproduction of the portion c' of the original. Fig. 2 illustrates three steps a, b, c, but the movement of the screen may be carried out in more steps, if desired. Likewise, the screen 30 may be moved step by step in the direction of the arrows A or B, by rotation of the shaft 50. If the screen 30 is moved continuously in the directions A, B, C or D, the negative is exposed periodically in the same manner as described above in connection with the apparatus shown in Fig. 1.

In the embodiment shown in Figs. 2 and 3 far angle stresses may occur during the exposure of the portions a and c of the original. Fig. 4 illustrates a different embodiment of the apparatus, in which far angle stresses are avoided, although the screen is moved and the negative is stationary. The camera 10 is mounted on the base 12, which carries the stationary mounting 14 in front of the camera. The mounting 14 is curved, and an original 18 may be attached thereto. The negative 28 is arranged inside the camera on a curved wall 58. The half-tone screen 60 is of cylindrical shape, and the axis of the cylinder is substantially perpendicular to the principal axis E—E of the lens 62. A pin 64 secured to the base of the cylindrical screen 30 is slidably arranged in a guide 66 and is connected to a bar 68. One end of said bar 68 carries a stud 70 journalled in the casing 72 forming a part of the camera. The axis of said stud 70 is in the optical center of the lens 62. The mounting 74 of said lens 62 is secured to the stud 70 and movably arranged in the casing 72. A shield 76 having an elongated slot 78 is arranged inside the cylindrical screen 60 in front of the rear wall facing the negative 28. Said shield 76 is secured to the other end of the bar 68. Furthermore, a compensator 80 having a slot 82 for the passage of the front wall of the cylindrical screen 60 is mounted on the bar 68. Moreover, means are provided, for example rack and pinion (not shown in the drawings), which cause a rotation of the cylindrical screen 60 about its axis (arrow F) simultaneously with a shifting of the pin 64 in the guide 66 (arrow G), so that the screen 60 rolls on the negative 28, when the bar 68 is rotated about the point 70 and swings the lens 62 about said point 70. As the bar 68 is connected to the lens mounting 74, the compensator 80, the cylindrical screen 60 and the shield 76, all parts are moved at the same time, when the bar 68 is moved. Preferably, the compensator 80 is made of a substance having the same index of refraction as the cylindrical screen 60, so that the compensator prevents an aberration of the rays of light, and the rays of light leaving the compensator are only displaced in parallel to the rays of light entering the compensator, as shown in the drawings.

The operation of the device is as follows:

The bar 68 is continuously rotated about the point 70, so that the cylindrical screen 60 rolls continuously on the negative 28. The negative 28 is continuously exposed through the elongated slot 78 of the shield 76, which permits a scanning of the original 18 line per line.

If it is desired to obtain high-grade dot-composed negatives, we provide means which cause a rotation of the cylindrical screen 60 about its axis at such a speed, that the circumference of the screen does not roll on the negative 28 but is moved to a certain degree relative to the negative when the cylindrical screen is moved in the direction of the arrow G. For example, the screen may be rotated about its axis at a somewhat higher speed than the speed, which is required for rolling the cylindrical screen on the negative without a relative movement between the surface of the screen and the negative.

In the apparatus according to Fig. 4, the parts 62, 80, 60 and 76 are movable as a unit and the original 18 and the negatives 28 are stationary. If desired, however, the unit 62, 80, 60, 76 could be stationary and the original 18 and the negative 28 could be movable, provided that means are arranged which cause a rotation of the screen 60 about its axis, when the negative 28 is moved.

Figs. 5 and 6 illustrate a further embodiment of an apparatus with a cylindrical half-tone screen 60. This embodiment eliminates the use of a compensator by the arrangement of two mirrors 81 and 83, so that the rays of light may enter the cylindrical screen 60 through its upper open end. The mirror 81 deflects the rays to the mirror 83, and the latter deflects the rays to the rear wall of the screen facing the curved negative 28. The mirror 81 is adjustably mounted on one end of a bar 67, the other end of which being keyed to the upper stud 70 arranged on the mounting 74 of the lens 62 and journalled in the casing 72 forming a part of the camera 10. The mirror 83 is adjustably mounted on a holder 85 passing through a hole in the bottom of the screen 60. The screen may rotate about said holder. The holder is secured to one end of a bar 69, the other end of said bar is keyed to the lower stud 70 of the lens mounting 74. The shield 76 with the elongated slot 78 has an arm 77 rigidly secured to the holder 85 inside the cylindrical screen 60. Means are provided (not shown in the drawings) which cause a rotation of the cylindrical screen 60 about its axis, when the unit consisting of the objective 62, 74, the bars 67, 69, the mirrors 81, 83, the screen 60 and the shield 76, 78 is swung by suitable means about the point 70 in either one of the directions G or L. The mounting 14 is adjustably secured to a support 15 by means of a screw 17. The support 15 is mounted on the base 12 in front of the camera. The mounting 14 is curved, so that the original attached to the mounting has a curved shape. Fig. 5 illustrates an operation, in which the lower half of the original is reproduced on the lower half of the negative 28. If it is desired to reproduce the upper half of the original, the unit 62, 74, 67, 69, 81, 83, 60, 76 must me lifted to such an extent, that the screen is in front of the upper portion z of the negative 28. If, however, the lens 62 is lifted for the same distance as the screen, the center of the lens is brought into a position which is too high with respect to the upper half of the original. The above mentioned screw 17, however, permits an adjustment of the original in upward direction, so that original, lens, screen and objective are again in proper relationship with respect to each other.

Figs. 7 and 8 illustrate a further embodiment of an apparatus with a cylindrical half-tone screen 60, in which, however, only one mirror 83 is used. The cylindrical screen 60 is arranged in such a manner, that one of its ends is opposite to the objective 23 and the rays of light enter without obstruction the screen through said end. Inside the cylindrical screen, the mirror 83 is arranged, which remains in the inclined illustrated position, when the screen is moved in the direction of the arrow H or K. The mirror 83 deflects the rays of light, so that the latter are directed to the negative 28 through the slot 78 of the shield 76 and the wall of the screen 60 facing the negative. The mirror is adjustably attached to a holder 84 carrying a sliding block 86 secured thereto. Said block 86 is slidably arranged between the guiding bars 88 secured to the casing of the camera 10. The arm 77 of the shield 76 is also keyed to the holder 84. The end of the cylindrical screen near to the sliding block 86 is provided with a pinion 92 meshing with a stationary rack 94 secured to the casing of the camera. A shift lever 96 is pivoted to the objective holder 98 at 100. Said holder 98, the camera 10 and a frame 102 for the mounting 14 are mounted on the base 12. The mounting 14 is slidably arranged in said frame 102. One end of the shift lever 96 is pivotally connected to said mounting 14 at 104, the other end of said lever 96 having the form of a fork is in engagement with the free end of the holder 84. Thus, if the lever 96 is rotated about the pivot 100, the cylindrical screen 60 and the mounting 14 holding the original 18 are moved in opposite directions, and at the same time the screen 60 is rotated about its axis by means of the pinion 92 being in engagement with the rack 94. In the embodiment according to Figs. 7 and 8, the negative 28 as well as the original 18 are straight.

The diagrammatic view of Fig. 9 illustrates an apparatus similar to that shown in Figs. 7 and 8, in which, however, the original 18 is held stationary. The movable unit consists only of the objective 23, the cylindrical screen 60, the mirror 83 and the shield 76, 78. Said unit may be moved in either one of the directions H or K parallel to the length of the original 18, and means (not shown) are provided for the rotation of the screen in either one of the directions M or N during the movement of the screen along the negative 28.

The operation of the devices shown in Figs. 5 to 9 is the same as the operation of the apparatus shown in Fig. 4. The negative is continuously exposed, while the screen 60 is continuously moved.

In the apparatus shown in the drawings either the negative is movable and the half-tone screen is stationary or the half-tone screen is movable and the negative is stationary. If desired, however, apparatus could be constructed in which both the negative and the half-tone screen are moved relative to each other during the operation.

In the above described methods, it is pointed out, that high-grade dot-composed negatives may be obtained by the use of normal half-tone screens as shown in Fig. 10, when the method is carried out in a certain way. Obviously, high-grade dot-composed negatives may be obtained also, when special half-tone screens having varying intensities in the transparent portions as shown in Fig. 11 are used for the screens 30 or 60.

Moreover, our methods may be used for the manufacture of large half-tone screens with or without varying intensities in the transparent portions in a photomechanical process. For this purpose, we use a white surface as the original and expose the negative according to any one of the above described methods, through a master half-tone screen, which may be a normal half-tone screen as shown in Fig. 10 or a special half-tone screen as shown in Fig. 11. The dot-composed negative thus obtained is utilized for the preparation of a half-tone screen according to any photographical process. If a special half-tone screen is used as master screen, a special half-tone screen is obtained, but special half-tone screens may be obtained also, when a normal half-tone screen is used as master screen and the above described methods for the production of high-grade dot-composed negatives are carried out.

As will be apparent from the above disclosure, in all embodiments of the invention shown in the drawings the screen and the negative are moved relative to each other in a straight line motion; according to Figs. 1, 2 and 7–9 the path of the relative movement of the screen and negative past each other is straight, and according to Figs. 4–6 the path of the relative movement of the screen and negative past each other is curved owing to the curved mounting of the negative.

Furthermore, it may be mentioned that the term negative used in the claims refers to a light sensitive element.

We have described preferred embodiments of our invention, but it is clear that numerous changes and omissions may be made without departing from the spirit of our invention.

What we claim is:

1. Means for the production of dot composed negatives by the reproduction of an original through a half tone screen on a negative, comprising means for moving a half tone screen of predetermined size and a negative of larger size than that of the half tone screen relative to each other in a straight line motion so as to place consecutive portions of the negative behind said half tone screen, interconnecting means for shifting said original relative to said negative to place consecutive portions of said original in proper position for reproduction on said consecutive portions of said negative, means for masking the portions of the negative not placed behind the half tone screen, and means for exposing said consecutive portions of said negative to corresponding consecutive portions of the original in timed relationship to the relative movement of said half tone screen and negative so as to prepare on said negative a continuously coherent reproduction of the original composed of a plurality of separate reproductions of consecutive portions of the original and being of larger size than that of the half tone screen.

2. Means for the production of dot composed negatives as claimed in claim 1, including means for a step by step movement of the half tone screen and the negative relative to each other in a straight line motion.

3. Means for the production of dot composed negatives as claimed in claim 1, including means for a step by step movement of the half tone screen and the negative relative to each other in a straight line motion, and means for exposing the consecutive portions of the negative when the half tone screen and the negative are at a standstill.

4. Means for the production of dot composed negatives as claimed in claim 1, including means for a step by step movement of the half tone screen and the negative relative to each other in a straight line motion, and means for exposing the consecutive portions of the negative during a part of each individual relative movement between the half tone screen and the negative.

5. Means for the production of dot composed negatives by the reproduction of an original through a half tone screen on a negative, comprising means for moving a half tone screen of predetermined size and a negative of larger size than that of the half tone screen relative to each other in a straight line motion along a substantially straight path so as to place consecutive portions of the negative behind said half tone screen, interconnecting means for shifting said original relative to said negative to place consecutive portions of said original in proper position for reproduction on said consecutive portions of said negative, means for masking the portions of the negative not placed behind the half tone screen, and means for exposing said consecutive portions of said negative to corresponding consecutive portions of the original in time relationship to the relative movement of said half tone screen and negative so as to prepare on said negative a continuously coherent reproduction of the original composed of a plurality of separate reproductions of consecutive portions of the original and being of larger size than that of the half tone screen.

LUDWIG MIES.
WALTER PETERHANS.